US011770620B2

(12) United States Patent
Han et al.

(10) Patent No.: US 11,770,620 B2
(45) Date of Patent: Sep. 26, 2023

(54) METHOD AND APPARATUS FOR ADJUSTING EXPOSURE TIME OF CAMERA AND DEVICE BASED ON ENERGY VALUE WHEN CAMERA COLLECTING AN IMAGING LIGHT SPOT

(71) Applicant: GOER OPTICAL TECHNOLOGY CO., LTD., Weifang (CN)

(72) Inventors: Xinxin Han, Weifang (CN); Nanjing Dong, Weifang (CN); Debo Sun, Weifang (CN)

(73) Assignee: GOER OPTICAL TECHNOLOGY CO., LTD., Weifang (CN)

( * ) Notice: Subject to any disclaimer, the term of this patent is extended or adjusted under 35 U.S.C. 154(b) by 0 days.

(21) Appl. No.: 16/969,936

(22) PCT Filed: Sep. 6, 2018

(86) PCT No.: PCT/CN2018/104392
§ 371 (c)(1),
(2) Date: Aug. 13, 2020

(87) PCT Pub. No.: WO2019/227757
PCT Pub. Date: Dec. 5, 2019

(65) Prior Publication Data
US 2021/0075949 A1    Mar. 11, 2021

(30) Foreign Application Priority Data

May 31, 2018 (CN) .......................... 201810552726.4

(51) Int. Cl.
H04N 23/73 (2023.01)
H04N 23/71 (2023.01)
(52) U.S. Cl.
CPC ............. H04N 23/73 (2023.01); H04N 23/71 (2023.01)

(58) Field of Classification Search
CPC ...... H04N 5/2353; H04N 5/2351; H04N 9/04; H04N 23/73; H04N 23/71
See application file for complete search history.

(56) References Cited

U.S. PATENT DOCUMENTS 9,313,415 B2 * 4/2016 Schieltz ............... H04N 5/2355
2005/0036778 A1 * 2/2005 DeMonte ............... G03B 13/32
396/89

(Continued)

FOREIGN PATENT DOCUMENTS

CN    101701847 A    5/2010
CN    103309031 A    9/2013
(Continued)

OTHER PUBLICATIONS

CN Office Action in application No. 201810552726.4 dated Mar. 13, 2019.

(Continued)

Primary Examiner — Luong T Nguyen
(74) Attorney, Agent, or Firm — HAUPTMAN HAM, LLP

(57) ABSTRACT

Provided are a method and an apparatus for adjusting an exposure time of a camera and a device, where the method includes: controlling the camera to collect an imaging light spot of an imaging component with a first exposure time; obtaining an energy value received when the camera collecting the imaging light spot; if the energy value is not within a set energy range, adjusting a duration of the first exposure time according to a relationship between the energy value and the energy range to update the first exposure time. The technical solution provided in the present disclosure can adjust the exposure time of the camera to a reasonable value so as to improve the accuracy and reliability of light spot analysis.

4 Claims, 3 Drawing Sheets

(56) References Cited

U.S. PATENT DOCUMENTS

| | | | |
|---|---|---|---|
| 2005/0093963 A1 | 5/2005 | Masuda | |
| 2005/0147318 A1* | 7/2005 | Park | H04N 5/208 382/266 |
| 2007/0052839 A1* | 3/2007 | Kong | G03B 7/08 348/364 |
| 2009/0183365 A1* | 7/2009 | Hsiao | G02B 7/02 29/836 |
| 2011/0297837 A1* | 12/2011 | Ishitsu | H01L 27/14658 250/370.08 |
| 2012/0212663 A1* | 8/2012 | Takita | H04N 5/238 348/E5.04 |
| 2013/0011078 A1* | 1/2013 | Phan | G06T 3/4053 382/279 |
| 2016/0205306 A1* | 7/2016 | Wang | H04N 5/2353 348/135 |
| 2016/0209728 A1* | 7/2016 | Shatz | H04M 1/72409 |
| 2019/0294913 A1* | 9/2019 | Kim | H04N 5/232939 |

FOREIGN PATENT DOCUMENTS

| | | |
|---|---|---|
| CN | 106657802 A | 5/2017 |
| CN | 106982333 A | 7/2017 |
| CN | 108419026 A | 8/2018 |

OTHER PUBLICATIONS

CN Office Action in application No. 201810552726.4 dated Nov. 4, 2019.

* cited by examiner

METHOD AND APPARATUS FOR ADJUSTING EXPOSURE TIME OF CAMERA AND DEVICE BASED ON ENERGY VALUE WHEN CAMERA COLLECTING AN IMAGING LIGHT SPOT

TECHNICAL FIELD

The present disclosure relates to the field of assembling technology, and in particular a method and an apparatus for adjusting an exposure time of a camera and a device.

BACKGROUND

Nowadays, there are more and more optical modules with independent functions in the market to meet diversified market demands. These optical modules can be embedded in other devices to perform their functions, such as camera modules, miniature projection modules, LED (short for Light Emitting Diode) optical modules, VR (short for Virtual Reality)/AR (short for Augmented Reality) optical modules and so on.

Generally, an optical module is assembled by a plurality of optical elements and other components. For example, the camera module can be assembled by components such as an image sensor, a lens base, a plurality of lenses, and a circuit board. Specifically, the assembly accuracy of the lens plays a decisive role in the optical performance of the optical module. In an optical module assembly method, the optical module images during the assembly process, the camera is used to collect the imaging light spot, and whether the lens to be assembled is aligned is determined according to the size of the imaging light spot. The alignment of the lens to be assembled is continuously adjusted if the lens is not aligned.

In the process of collecting the imaging light spot by the camera, in order to ensure a collecting quality of the imaging light spot, the exposure time of the camera needs to be controlled within a reasonable range. Therefore, how to control the exposure time of the camera within a target range is a technical problem to be solved urgently.

SUMMARY

Various aspects of the present disclosure provide a method and an apparatus for adjusting an exposure time of a camera and a device, which are used to adjust the exposure time of the camera to a reasonable value, which is conducive to shooting a clear imaging light spot, so as to improve the accuracy and reliability of light spot analysis.

The present disclosure provides a method for adjusting an exposure time of a camera, including:
controlling the camera to collect an imaging light spot of an imaging component with a first exposure time;
obtaining an energy value received when the camera collecting the imaging light spot;
if the energy value is not within a set energy range, adjusting a duration of the first exposure time according to a relationship between the energy value and the energy range to update the first exposure time.

Further optionally, if the energy value is within the set energy range, the method further includes: using the first exposure time as an optimal exposure time of the camera collecting the imaging light spot.

Further optionally, the adjusting the duration of the first exposure time according to the relationship between the energy value and the energy range, includes: if the energy value is higher than an upper limit of the energy range, reducing the duration of the first exposure time by a set step; or if the energy value is lower than a lower limit of the energy range, increasing the duration of the first exposure time by the set step.

Further optionally, wherein the adjusting the duration of the first exposure time to update the first exposure time, further includes: when the first exposure time being updated, controlling an imaging brightness of the imaging component to remain unchanged.

Further optionally, when a color depth of the camera is 14 bits, the energy range of the camera is 10000±500.

The present disclosure further provides an apparatus for adjusting an exposure time of a camera, including:
a collecting module, configured to control the camera to collect an imaging light spot of an imaging component with a first exposure time;
an energy obtaining module, configured to obtain an energy value received when the camera collecting the imaging light spot; and
an exposure time determining module, configured to adjust a duration of the first exposure time according to a relationship between the energy value and the energy range, if the energy value is not within a set energy range, to update the first exposure time.

Further optionally, the exposure time determining module is further configured to: use the first exposure time as an optimal exposure time of the camera collecting the imaging light spot, if the energy value is within the set energy range.

Further optionally, the exposure time determining module is specifically configured to: if the energy value is higher than an upper limit of the energy range, reduce the duration of the first exposure time by a set step; or if the energy value is lower than a lower limit of the energy range, increase the duration of the first exposure time by the set step.

Further optionally, the exposure time determining module is further configured to: when the first exposure time being updated, control an imaging brightness of the imaging component to remain unchanged.

The present disclosure further provides an electronic device, including: a memory and a processor; where the memory is used to store at least one computer instruction; and the processor is coupled with the memory for executing the method for adjusting the exposure time of the camera provided by the present disclosure.

In the present disclosure, after the imaging component images, the camera can be used to obtain the imaging light spot to analyze the imaging characteristics of the imaging component. In the above process, it is judged whether the energy value received when the camera collecting the imaging light spot is within the set energy range or not, and the exposure time is adjusted based on the judgment result. The present embodiment is conducive to adjusting the exposure time of the camera to the reasonable value, which is conducive to shooting a clear imaging light spot, so as to improve the accuracy and reliability of light spot analysis.

BRIEF DESCRIPTION OF THE DRAWINGS

In order to more clearly explain the embodiments of the present disclosure or the technical solutions in the prior art, the drawings used in the description of the embodiments or the prior art will be briefly introduced below. Obviously, the drawings in the following description are some embodiments of the present disclosure. For those of ordinary skill in the art, other drawings can be obtained based on these drawings without paying creative labor.

DETAILED DESCRIPTION OF EXAMPLE EMBODIMENTS

For making the purposes, technical solutions and advantages of the embodiments of the present disclosure clearer, the technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

In an existing optical module alignment assembly method, a light source is used to illuminate the optical module to be aligned to make it image, and then a camera is used to obtain the imaging light spot of the optical module to be aligned. After that, based on the position and size of the collected imaging light spot, it is analyzed whether the lens to be assembled and the optical element to be assembled in the optical module to be aligned are aligned.

The exposure time is an important parameter of camera imaging. Generally, the longer the exposure time is, the more photons the photosensitive material of the camera receives, the brighter the shot image is, and vice versa. In the optical module alignment assembly method based on spot analysis, when the camera is used to collect the imaging light spot, if the exposure time of the camera is too short, the collected imaging light spot will be relative dark, which is not conducive to capturing the characteristics of the imaging light spot; and if the exposure time is too long, the collected imaging light spot will be relative brighter, causing the shot light spot to be abnormal. For example, some pixels at the edge of the light spot will be lost due to overexposure, which is also not conducive to capturing the characteristics of the imaging light spot.

Therefore, in the optical module alignment assembly method based on the spot analysis, in order to improve the reliability and accuracy of the spot analysis, the brightness and clarity of the light spot need to be kept within a reasonable range, and the exposure time of the camera needs to be controlled thereby.

Figure 1:
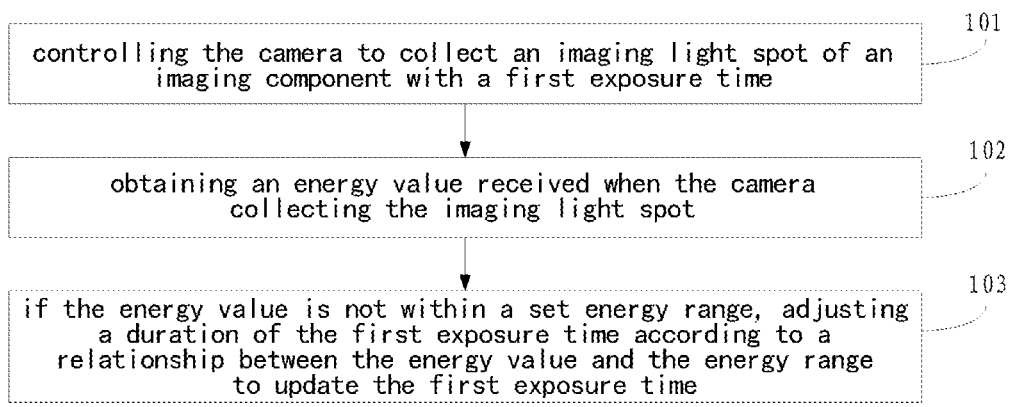
FIG. 1 is a flowchart of a method for adjusting an exposure time of a camera according to an embodiment of the present disclosure.

In view of this, an embodiment of the present disclosure provides a method for adjusting an exposure time of a camera. As shown in FIG. 1, the method includes:

step 101: controlling the camera to collect an imaging light spot of an imaging component with a first exposure time;

step 102: obtaining an energy value received when the camera collecting the imaging light spot; and step 103: if the energy value is not within a set energy range, adjusting a duration of the first exposure time according to a relationship between the energy value and the energy range to update the first exposure time.

When the camera shoots one certain object, the incident light falls on the pixel array of the photosensitive element in the camera in the form of photons. The energy of each photon is absorbed by the photosensitive element and reacts to generate an electron. The energy value received by the camera when collecting the imaging light spot in the present embodiment refers to the light energy value absorbed by the photosensitive element in the camera when the photosensitive element in the camera shoots the imaging light spot. The light energy value is related to the imaging brightness of the imaging component and the exposure time of the camera. Therefore, in the present embodiment, under the condition that the imaging brightness of the imaging component remains unchanged, the energy value received when the camera collecting the imaging light spot can be used as a reference to adjust the exposure time of the camera.

Specifically, the first exposure time refers to the time from opening to closing the shutter of the camera. The exposure time determines the quality of the imaging light spot shot by the camera. When the first exposure time is within a reasonable range, the camera can shoot an imaging light spot with better quality, which is conducive to conducting the analyzing and calculating of the size and the barycentric coordinates of the light spot. When the above-mentioned camera shoots a better quality imaging light spot, the range corresponding to the light energy value received by the photosensitive element in the camera can be used as the set energy range to determine whether the exposure time of the camera is reasonable.

If the energy received when the camera collecting the imaging light spot is not within the set energy range, it means that the first exposure time is unreasonable, and the first exposure time need to be updated at this time. Based on the updated first exposure time, the camera continues to collect the imaging light spot. Then, it is determined whether to continue adjusting the duration of the first exposure time according to the energy received when the camera collecting the imaging light spot. That is to say, the process of adjusting the first exposure time of the camera in the present embodiment is a cyclically executed process, and the specific cyclic process is described in steps 101 to 103. When the energy value received by the camera when collecting the imaging light spot is within the set energy range, the cycle ends.

In the present embodiment, after the imaging component images, a camera can be used to obtain the imaging light spot to analyze the imaging characteristics of the imaging component. In the above process, it is judged whether the energy value received when the camera collecting the imaging light spot is within the set energy range or not, and the exposure time is adjusted based on the judgment result. The present embodiment is conducive to adjusting the exposure time of the camera to the reasonable value, which is conducive to shooting a clear imaging light spot, so as to improve the accuracy of the calculating of the size and centroid of the light spot.

The foregoing or following embodiments of the present disclosure are applicable to cameras using CCD (short for Charge-coupled Device)/CMOS (short for Complementary Metal Oxide Semiconductor) as the photosensitive element. The following part will specifically describe method for adjusting the exposure time of the camera according to the present disclosure with a specific optional embodiment in conjunction with FIG. 2a.

Figure 2A:
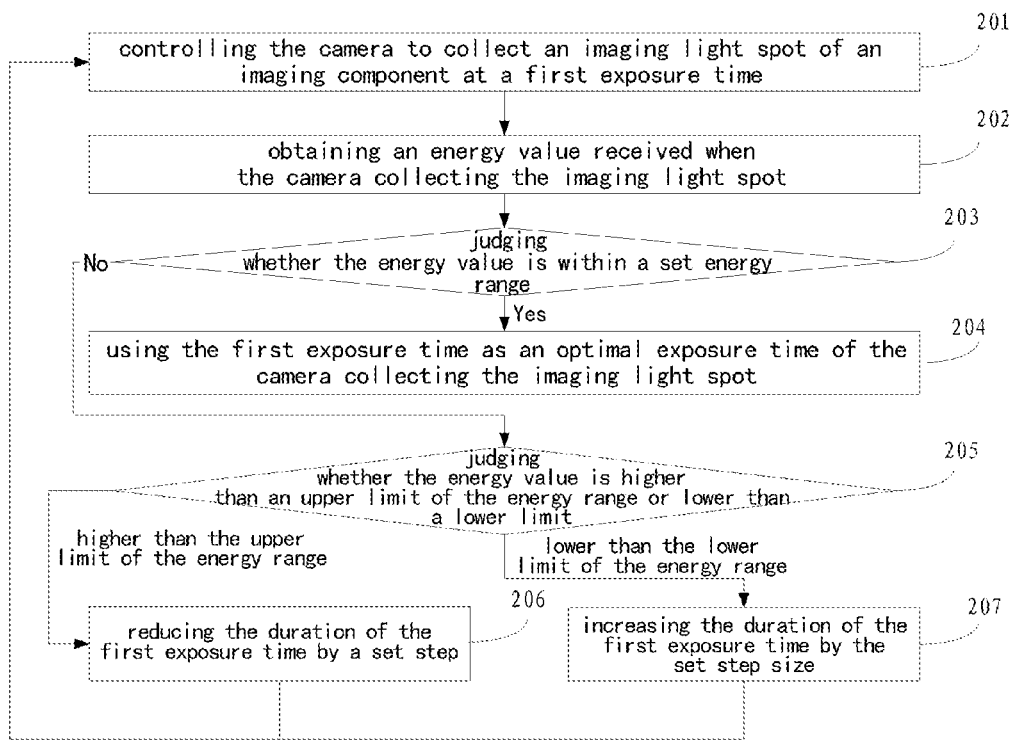
FIG. 2a is a flowchart of a method for adjusting an exposure time of a camera according to another embodiment of the present disclosure.

FIG. 2a is a flowchart of a method for adjusting an exposure time of a camera according to another embodiment of the present disclosure. As shown in FIG. 2a, the method includes:

step 201: controlling the camera to collect an imaging light spot of an imaging component at a first exposure time;

step 202: obtaining an energy value received when the camera collecting the imaging light spot;

step 203: judging whether the energy value is within a set energy range or not, if yes, go to step 204; if no, go to step 205;

step 204: using the first exposure time as an optimal exposure time of the camera collecting the imaging light spot;

step 205: judging whether the energy value is higher than an upper limit of the energy range or lower than a lower limit of the energy range; if it is higher than the upper limit of the energy range, go to step 206; if it is lower than the lower limit of the energy range, go to step 20;

step 206: reducing the duration of the first exposure time by a set step, and go to step 201; and step 207: increasing the duration of the first exposure time by the set step size, and go to step 201.

Optionally, in the light spot detection apparatus used in the optical module alignment assembly, the object light source included in the imaging component is a multi-color color light source. The multiple optical modules included in the imaging component can respectively image the color light source to obtain light spots with different colors, and then the camera can collect and analyze the imaging light spots of multiple optical modules to finally achieve simultaneous conducting the alignment assembly of the multiple optical modules.

In this application scenario, the camera used to shoot the imaging light spot needs to have a high color image collecting capability. In the present embodiment, optionally, in order to make the colored imaging light spot have a better imaging effect on the camera, a camera with a color depth of 14 bits is selected to collect the imaging light spot.

In step 202, when the object is focused on the photosensitive element of the camera through the lens of the camera, such as a CCD/CMOS chip, the photosensitive element can accumulate a corresponding proportion of charge according to the intensity of light and the number of photons, and form an image signal to output. Therefore, in this step, the energy value received when the camera collecting the imaging light spot can be obtained by obtaining the intensity of the image signal output by the camera.

Figure 2B:
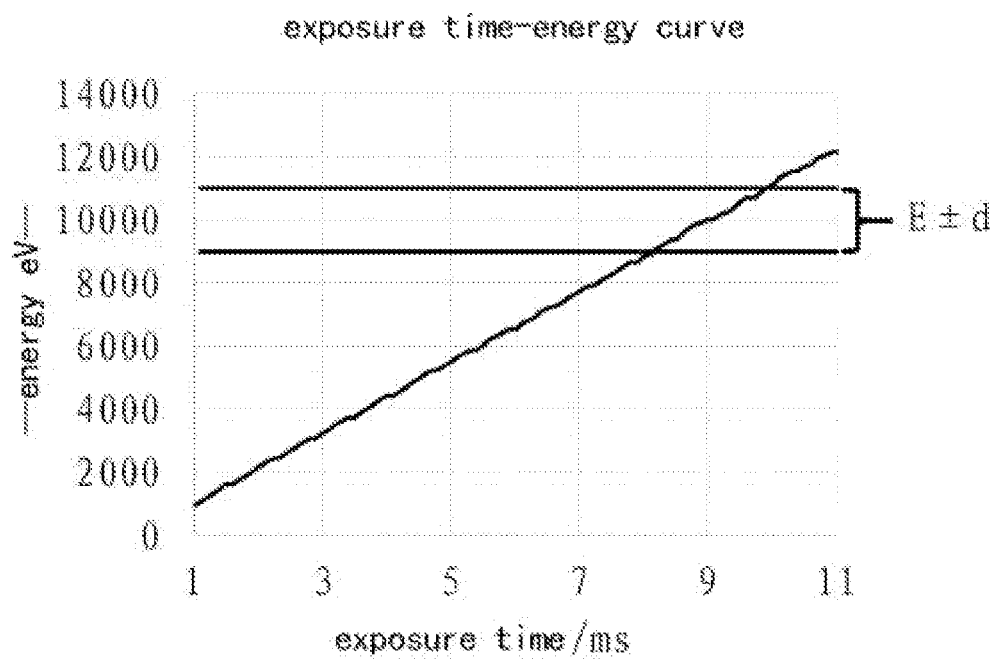
FIG. 2b is a schematic diagram of an exposure time-energy curve according to an embodiment of the present disclosure.

In step 203, the relationship between the exposure time and the energy value may be as shown in the curve of FIG. 2b. In FIG. 2b, the horizontal axis represents the exposure time in ms, the vertical axis represents the energy value, where E represents the ideal optimal energy value, d represents the allowable fluctuation error of the optimal energy value, and E±d represents the energy range corresponding to the optimal energy. It should be understood that the amount of energy collected by the camera can be quantified as the size of the gray value. For example, the higher the energy collected by the camera is, the brighter the corresponding image brightness is, and the higher the gray value of the corresponding pixel is. Based on this, in the foregoing or following embodiments of the present disclosure, the size of the gray value may be used to represent the amount of the energy value received when the camera collecting the imaging light spot, and the range of the gray value of the pixel can be used to represent the energy range.

Optionally, when the color depth of the camera is 14 bits, E=10000 and d=500 can be set, that is, the energy range corresponding to the camera can be within 10000±500. When the energy value received when the camera collecting the imaging light spot is within [9500, 1050], the quality of the collected imaging light spot is higher.

In step 204, when the energy value received when the camera collecting the imaging light spot is within the energy range, for example, [9500, 10500], it can be considered that the exposure time of the camera at this time is within a reasonable range, and the exposure time can be regarded as the optimal exposure time of the camera collecting the imaging light spot. When the imaging light spot is subsequently collected, it can be collected based on the optimal exposure time to improve the quality of the imaging light spot, improve the accuracy of the calculating of the size and centroid of the light spot, and improve the alignment accuracy of the optical module.

In steps 205 to 207, when the energy value received when the camera collecting the imaging light spot is not within the energy range, for example, less than 9500 or greater than 10500, it can be determined that the setting of the first exposure time is unreasonable. At this time, the first exposure time can be adjusted. Optionally, in the case of higher than the upper limit of the energy range, for example, greater than 10500, the exposure time is considered to be too long, and the duration of the first exposure time needs to be reduced in this case. In the case of lower than the lower limit of the energy range, for example, less than 9500, the exposure time is considered to be too short, and the duration of the first exposure time needs to be increased in this case. Optionally, the step of the reducing or increasing of the first exposure time is an empirical value, which can be set according to the actual energy value, which is not limited in the present embodiment.

After adjusting the first exposure time, step 201 can be continued to continue the process of collecting the imaging light spot with the adjusted first exposure time, which will not be repeated. It should be noted that, in the present embodiment, each time the imaging light spot is collected with the updated first exposure time, the imaging brightness of the imaging component needs to be controlled to be constant to ensure the reliability of the obtained energy value.

In the present embodiment, when the camera is used to obtain the imaging light spot of the imaging component to analyze the imaging characteristics of the imaging component, the exposure time of the camera is adjusted based on the energy value received when the camera collecting the imaging light spot, which is conducive to shooting a clear imaging light spot, so as to improve the accuracy of calculating of the size and centroid of the light spot, and is conducive to ultimately improving the accuracy of the alignment assembly of the optical module.

It should be noted that the expressions herein of "first", "second", etc. are intended to distinguish between different messages, devices, modules, etc., and are not intended to represent a sequential order, nor is it intended to limit that "first" and "second" are of different types.

It is also to be noted that terms "include", "contain" or any other variants thereof are intended to include nonexclusive inclusions, thereby ensuring that a commodity or system including a series of elements not only includes those elements but also includes other elements which are not clearly listed or further includes elements intrinsic to the commodity or the system. Under the condition of no more restrictions, an element defined by statement "including a/an" does not exclude existence of another element which is the same in a commodity or system including the element.

Figure 3:
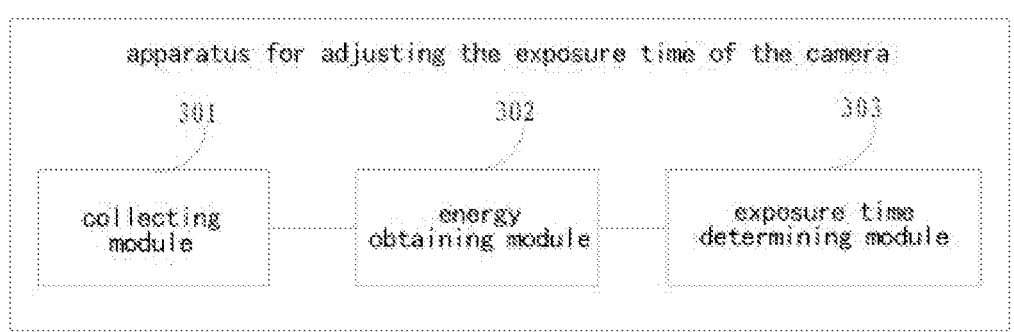
FIG. 3 is a schematic structural diagram of an apparatus for adjusting an exposure time of a camera according to an embodiment of the present disclosure.

The above describes optional implementations of the method for adjusting the exposure time of the camera. As shown in FIG. 3, in practice, the method for adjusting the exposure time of the camera can be implemented by an apparatus for adjusting the exposure time of the camera, as shown in FIG. 3, the apparatus includes:

a collecting module 301, is configured to control the camera to collect an imaging light spot of an imaging component with a first exposure time;

an energy obtaining module 302, is configured to obtain an energy value received when the camera collecting the imaging light spot; and an exposure time determining module 303, is configured to adjust a duration of the first exposure time according to a relationship between the energy value and the energy range, if the energy value is not within a set energy range, to update the first exposure time.

Further optionally, the exposure time determining module 303 is further configured to: use the first exposure time as an optimal exposure time of the camera collecting the imaging light spot, if the energy value is within the set energy range.

Further optionally, the exposure time determining module 303 is specifically configured to: if the energy value is higher than an upper limit of the energy range, reduce the duration of the first exposure time by a set step; or if the energy value is lower than a lower limit of the energy range, increase the duration of the first exposure time by the set step.

Further optionally, the exposure time determining module 303 is further configured to: when the first exposure time being updated, control an imaging brightness of the imaging component to remain unchanged.

The aforementioned apparatus for adjusting the exposure time of the camera can execute the method for adjusting the exposure time of the camera according to the embodiment of the present disclosure, and has the corresponding functional modules and beneficial effects for the execution method. Technical details that are not described in detail in the present embodiment can refer to the method provided in the embodiment of the present disclosure, and will not be repeated.

Figure 4:
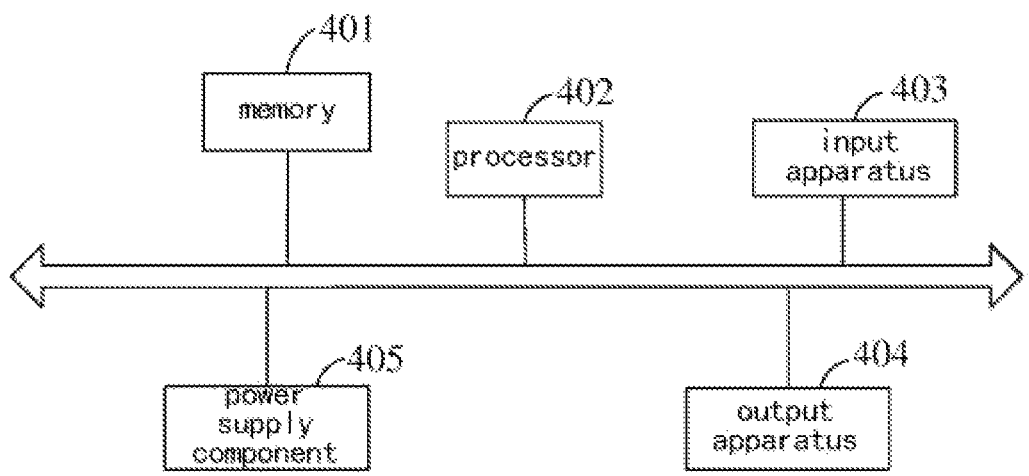
FIG. 4 is a schematic structural diagram of an electronic device according to an embodiment of the present disclosure.
Figure 5:
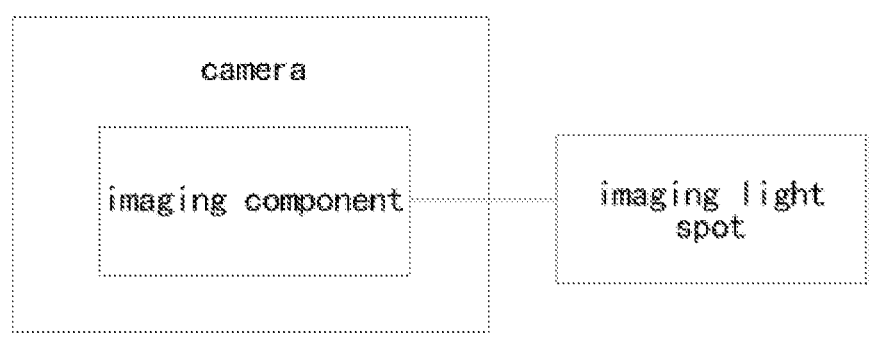
FIG. 5 is a schematic structural diagram of a camera according to an embodiment of the present disclosure.

The internal structure and function of the apparatus for adjusting of the exposure time of the camera are described above. In practice, the apparatus for adjusting the exposure time of the camera can be represented as an electronic device. As shown in FIG. 4, the electronic device includes a memory 401, a processor 402, an input apparatus 403, and an output apparatus 404.

The memory 401, the processor 402, the input apparatus 403, and the output apparatus 404 may be connected by a bus or other means. The bus connection is taken as an example in FIG. 4.

The memory 401 is used to store one or more computer instructions, and can be configured to store various other data to support operations on the device for adjusting the exposure time of the camera. Examples of such data include instructions of any application or method operated on the device for adjusting the exposure time of the camera.

The memory 401 can be implemented by any type of volatile or non-volatile storage device or a combination of them, such as static random access memory (SRAM for short), electrically erasable programmable read-only memory (EEPROM for short), erasable Programmable Read Only Memory (EPROM for short), Programmable Read Only Memory (PROM for short), Read Only Memory (ROM for short), Magnetic Memory, Flash Memory, Magnetic Disk or Optical Disk.

In some embodiments, the memory 401 may optionally include a memory remotely set with respect to the processor 402, and the remote memory may be connected to the device for adjusting the exposure time of the camera via a network. Examples of the aforementioned network include but are not limited to the Internet, corporate intranet, local area network, mobile communication network, and combinations thereof.

The processor 402 is coupled with the memory 401, and is configured to execute the one or more computer instructions for executing the method provided in the embodiment corresponding to FIG. 1 to FIG. 2a.

The input apparatus 403 can receive inputted number or character information, and generate key signal input related to user setting and function control of the device for adjusting the exposure time of the camera. The output apparatus 404 may include a display device such as a display screen.

Further, as shown in FIG. 4, device for adjusting the exposure time of the camera further includes: a power supply component 405. The power supply component 405 provides power for various components of the device where the power supply component is located. The power supply component may include a power management system, one or more power supplies, and other components associated with generating, managing, and distributing power for the device where the power supply component is located.

The aforementioned device for adjusting the exposure time of the camera can execute the method for adjusting the exposure time of the camera provided by the embodiments of the present application, and has the corresponding functional modules and beneficial effects for the execution method. Technical details that are not described in detail in the present embodiment can refer to the method provided in the embodiment of the present disclosure, and will not be repeated.

The above is only the embodiment of the present disclosure and not intended to limit the present disclosure. Those skilled in the art may make various modifications and variations to the present disclosure. Any modifications, equivalent replacements, improvements and the like made within the spirit and principle of the present disclosure shall fall within the scope of the claims of the present disclosure.

What is claimed is:

1. A method for adjusting an exposure time of a camera, applied to determine whether multiple optical modules to be aligned in an imaging component are aligned or not, comprising:

controlling the camera to collect an imaging light spot of the imaging component with a first exposure time;

obtaining an energy value received by a photosensitive element in the camera when the camera collecting the imaging light spot;

in response to the energy value being within a set energy range, using the first exposure time as an optimal exposure time of the camera collecting the imaging light spot;

in response to the energy value being higher than an upper limit of the set energy range, reducing the duration of the first exposure time by a set amount to update the first exposure time;

in response to the energy value being lower than a lower limit of the set energy range, increasing the duration of the first exposure time by the set amount to update the first exposure time; and repeatedly controlling the camera to collect the imaging light spot of the imaging component with the updated first exposure time, until an updated energy value is within the set energy range, wherein when each time repeatedly controlling, an imaging brightness of the imaging component is controlled to be constant.

2. The method according to claim 1, wherein when a color depth of the camera is 14 bits, the set energy range of the camera is 10000±500 eV.

3. An apparatus for adjusting an exposure time of a camera, applied to determine whether multiple optical modules to be aligned in an imaging component are aligned or not, comprising:
   a memory storing instructions; and
   a processor configured to execute the instructions to:
   control the camera to collect an imaging light spot of the imaging component with a first exposure time;
   obtain an energy value received by a photosensitive element in the camera when the camera collecting the imaging light spot;
   in response to the energy value being within a set energy range, using the first exposure time as an optimal exposure time of the camera collecting the imaging light spot;
   in response to the energy value being higher than an upper limit of the set energy range, reducing the duration of the first exposure time by a set amount to update the first exposure time;
   in response to the energy value being lower than a lower limit of the set energy range, increasing the duration of the first exposure time by the set amount to update the first exposure time; and
   repeatedly controlling the camera to collect the imaging light spot of the imaging component with the updated first exposure time, until an updated energy value is within the set energy range, wherein when each time repeatedly controlling, an imaging brightness of the imaging component is controlled to be constant.

4. An electronic device, comprising: a memory and a processor;
   wherein the memory is used to store at least one computer instruction;
   the processor is coupled with the memory for executing the method according to claim 1.

* * * * *